United States Patent
Hsu et al.

(10) Patent No.: US 7,267,565 B2
(45) Date of Patent: Sep. 11, 2007

(54) CARD CONNECTOR WITH EJECTOR

(75) Inventors: Chang-Shin Hsu, Tu-Cheng (TW);
Sen-Bing Zhao, ShenZhen (CN)

(73) Assignee: Hon Hai Precision Ind. Co., Ltd.,
Taipei Hsien (TW)

( * ) Notice: Subject to any disclaimer, the term of this patent is extended or adjusted under 35 U.S.C. 154(b) by 0 days.

(21) Appl. No.: 11/213,089

(22) Filed: Aug. 26, 2005

(65) Prior Publication Data

US 2007/0004257 A1    Jan. 4, 2007

(30) Foreign Application Priority Data

Jul. 2, 2005    (CN) ................. 2005 2 0073357

(51) Int. Cl.
 *H01R 13/62* (2006.01)
(52) U.S. Cl. ........................................ 439/159
(58) Field of Classification Search ............. 439/159, 439/155, 152, 607, 630
See application file for complete search history.

(56) References Cited

U.S. PATENT DOCUMENTS

| 4,952,161 | A | * | 8/1990 | Komatsu | ............. | 439/155 |
|---|---|---|---|---|---|---|
| 6,109,941 | A | * | 8/2000 | Koseki et al. | ............. | 439/159 |
| 6,382,995 | B1 | * | 5/2002 | Bricaud et al. | ............. | 439/159 |
| 6,482,020 | B1 | * | 11/2002 | Yeh | ............. | 439/159 |
| 6,619,971 | B1 | * | 9/2003 | Chen | ............. | 439/159 |
| 6,669,494 | B2 | | 12/2003 | Abe | | |
| 6,729,894 | B2 | * | 5/2004 | Ooya et al. | ............. | 439/159 |
| 6,761,569 | B2 | * | 7/2004 | Nakamura | ............. | 439/159 |
| 6,976,860 | B1 | * | 12/2005 | Su | ............. | 439/159 |
| 2004/0009691 | A1 | * | 1/2004 | Chang | ............. | 439/159 |
| 2004/0014342 | A1 | * | 1/2004 | Yu et al. | ............. | 439/159 |
| 2005/0085114 | A1 | * | 4/2005 | Su et al. | ............. | 439/159 |

* cited by examiner

*Primary Examiner*—Tulsidas C. Patel
*Assistant Examiner*—Vladimir Imas
(74) *Attorney, Agent, or Firm*—Wei Te Chung

(57) ABSTRACT

A card connector includes an insulating housing (10), a number of contacts (20) and an ejector (30). The insulating housing (10) defines a card receiving space (13) with a card insertion/ejection direction. The contacts (20) are retained in the insulating housing (10) and include a plurality of contacting portions (23) exposed into the card receiving space (13) to electrically connect with a card. The ejector (30) is assembled to the insulating housing (10) includes an ejecting arm (323) exposed into the card receiving space (13) to eject a card. The ejecting arm (323) includes a shield portion (326) extending in the card receiving space (13) along the card ejection direction from a transverse lateral side of the ejecting arm (323) being away from the contacts (20).

20 Claims, 5 Drawing Sheets

CARD CONNECTOR WITH EJECTOR

BACKGROUND OF THE INVENTION

1. Field of the Invention

The present invention is generally related to a card connector, and especially to a card connector which is adapted for insertion/ejection of a card.

2. Description of Related Art

Integrated circuit (IC) cards are used in a variety of appliances in conjunction with corresponding card connectors. In order to insert IC cards into the card connectors accurately and fully and draw the IC cards out of the card connectors conveniently, the card connectors commonly equip with ejectors to achieve above-mentioned object.

U.S. Pat. No. 6,669,494 discloses a commonly card connector for receiving an electrical card. The card connector defines a card receiving space and comprises an insulating housing, a plurality of contacts exposed into the card receiving space and arranged on a bottom wall of the insulating housing and a card eject mechanism. The card eject mechanism is formed with a card engagement portion protruding into the card receiving space for ejecting the electrical card out of the card connector. The card engagement portion locates over the contacts.

In normal state, the electrical card is safely inserted into the card receiving space and collides with a side face of the card engagement portion. However, because the electrical card is thin, the card easily engages with an upper face of the card engagement portion by mistake. Thus, the card is elevated by the card engagement portion so that it can't connect with the contacts. What is worse, the card may be destroyed.

Hence, an improved card connector is highly desired to overcome the aforementioned disadvantages of the prior art.

SUMMARY OF THE INVENTION

Accordingly, an object of the present invention is to provide a card connector which has an ejector for inserting/ejecting a card conveniently.

To achieve the above object, a card connector is adapted for receiving a card and comprises an insulating housing, a plurality of contacts and an ejector. The insulating housing defines a card receiving space with a card insertion/ejection direction. The contacts are retained in the insulating housing and comprise a plurality of contacting portions exposed into the card receiving space to electrically connect with a card. The ejector is assembled to the insulating housing and comprises an ejecting arm exposed into the card receiving space to eject a card. The ejecting arm comprises a shield portion extending in the card receiving space from one lateral side of the ejecting arm protruding into the card receiving space along a transverse direction perpendicular to the card insertion/ejection direction.

Other objects, advantages and novel features of the present invention will be drawn from the following detailed description of a preferred embodiment of the present invention with attached drawings.

DETAILED DESCRIPTION OF THE INVENTION

Figure 1:
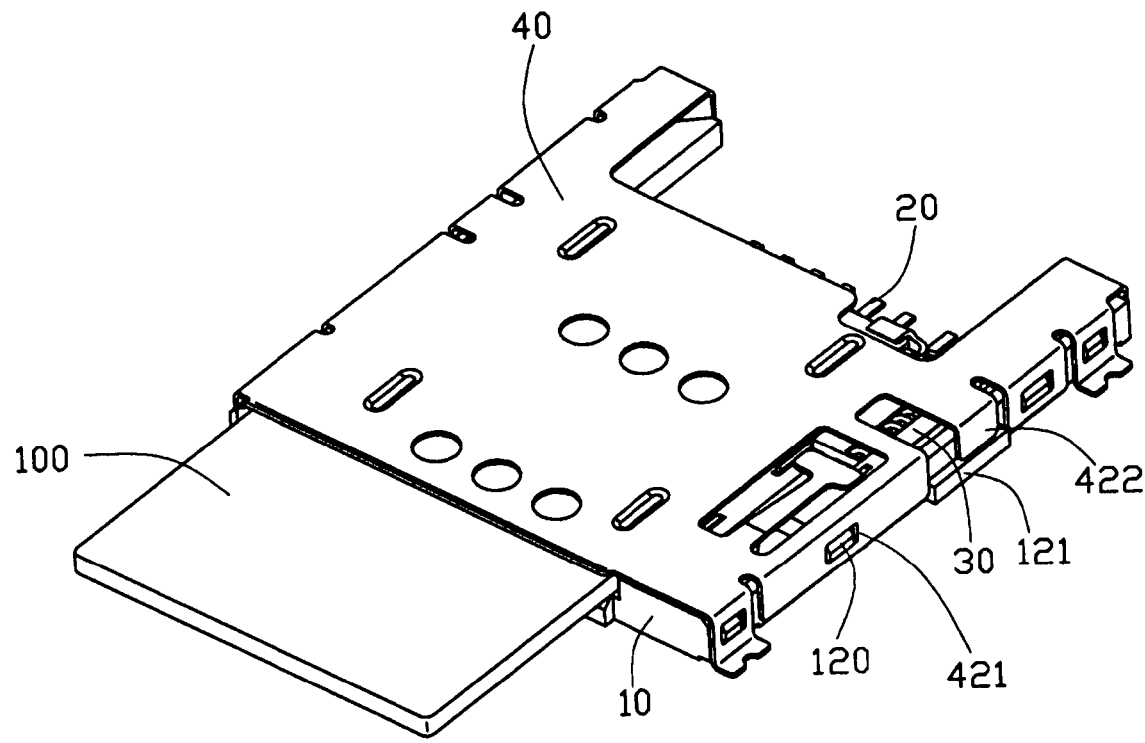
FIG. 1 is an assembled, perspective view of a card connector in accordance with the present invention with a card accommodated therein.

Reference will now be made in detail to the preferred embodiment of the present invention.

Referring to FIGS. 1-5, the card connector in accordance with the present invention is adapted for receiving a card 100, such as a SIM card. The card connector comprises an insulating housing 10, a plurality of contacts 20 received in the insulating housing 10, an ejector 30 and a shell 40 for covering the insulating housing 10.

Figure 2:
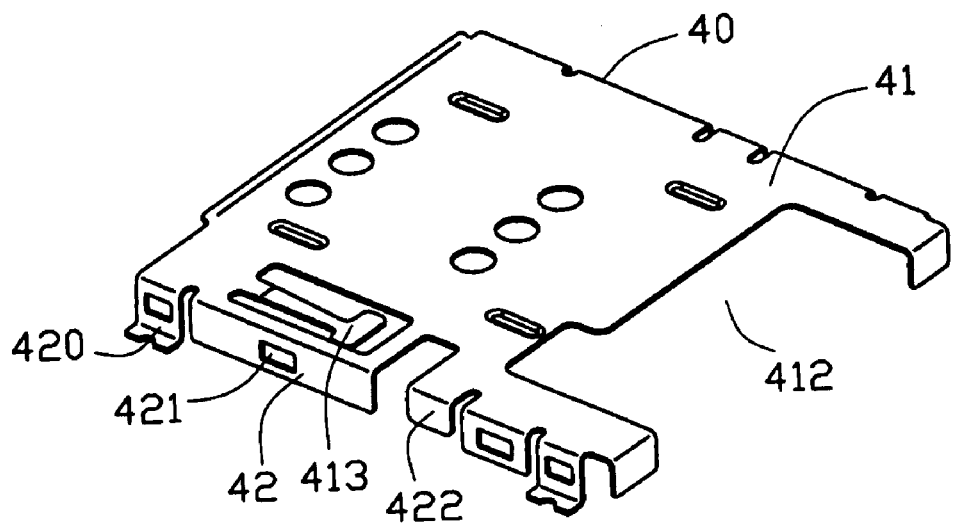
FIG. 2 is an exploded, perspective view of the card connector of FIG. 1 with an ejector assembled to an insulating housing.
Figure 2:
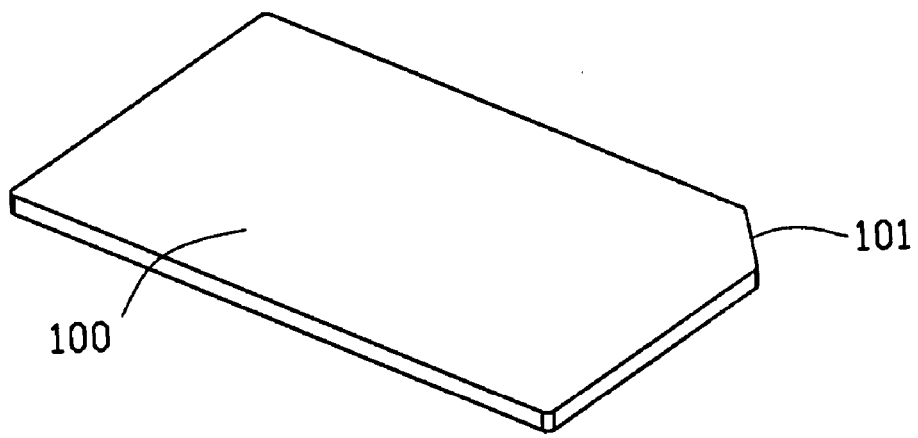
Figure 2:
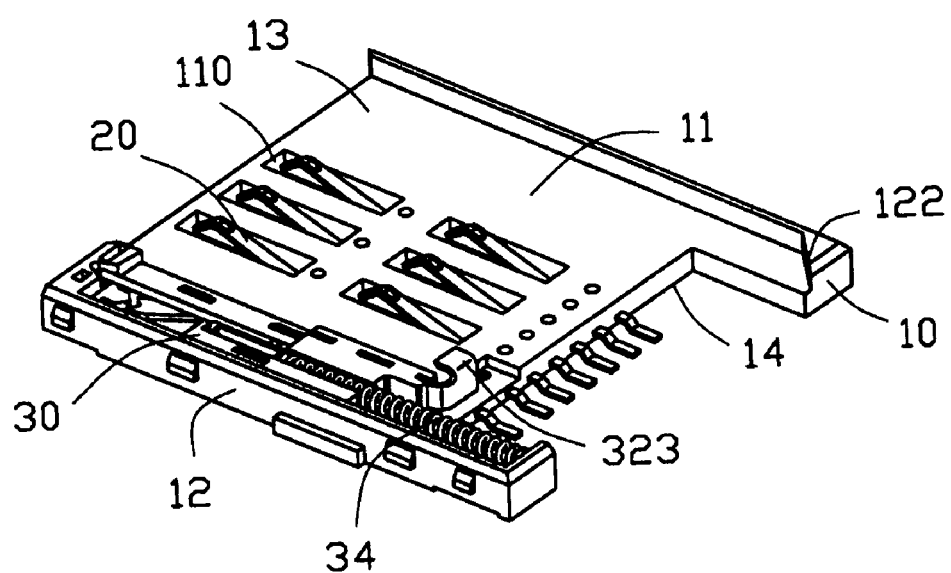

Referring to FIG. 2, the insulating housing 10 is approximately frame configuration. The insulating housing 10 comprises a bottom wall 11 and a pair of opposite right and left sidewalls 12 extending upwardly from lateral sides of the bottom wall 13, which commonly define a card receiving space 13 for accommodating the SIM card 100. The bottom wall 11 defines an opening 14 at rear end thereof and is formed with a plurality of rectangular receiving passages 110 arranged in two rows along a card insertion/ejection direction. The right and left sidewalls 12 are formed with a plurality of wedges 120 on outsides thereof, respectively. A pair of protruding blocks 121 protrude outwardly from lower sides of the opposite sidewalls 12, respectively.

The contacts 20 are divided into two groups which are insert-molded with the insulating housing 10, respectively. Each contact 20 comprises a contacting portion 23 received in the corresponding receiving passage 110 and partially exposed into the card receiving space 13, an intermediate portion (not labeled) extending rearward from the contacting portion 23 and molded in the insulating housing 10 and a soldering portion 24. The soldering portion 24 extends rearward from the intermediate portion to expose into the opening 14.

The right sidewall 12 of the insulating housing 10 is formed with a pair of front and rear walls 16 at front and rear ends thereof, together defining a rectangular receiving concave 15 communicating with the card receiving space 13 along the card insertion direction for accommodating the ejector 30. The bottom wall 11 defines a recess 152 at rear end thereof faced to the opening 14 to communicate with the receiving concave 15. A column 162 protrudes forwardly from the rear wall 16 and is exposed into the concave 15. A downwardly recessed hole 153 is formed on the right sidewall 12 in alignment with the column 162 along a vertical direction perpendicular to the card insertion direction.

The right sidewall 12 defines a rectangular recess section 150 downwardly recessed from a bottom face of the receiving concave 15 and locating approximately in middle of the receiving concave 15. A pair of grounding terminals 22 are insert-molded with the insulating housing 10 with contacting portions (not labeled) received in the rectangular hole 150 and partially exposed into the concave 15. Tail portions of the grounding terminals 22 are exposed into the opening 14 to align with the soldering portions 24 of the contacts 20.

Figure 3:
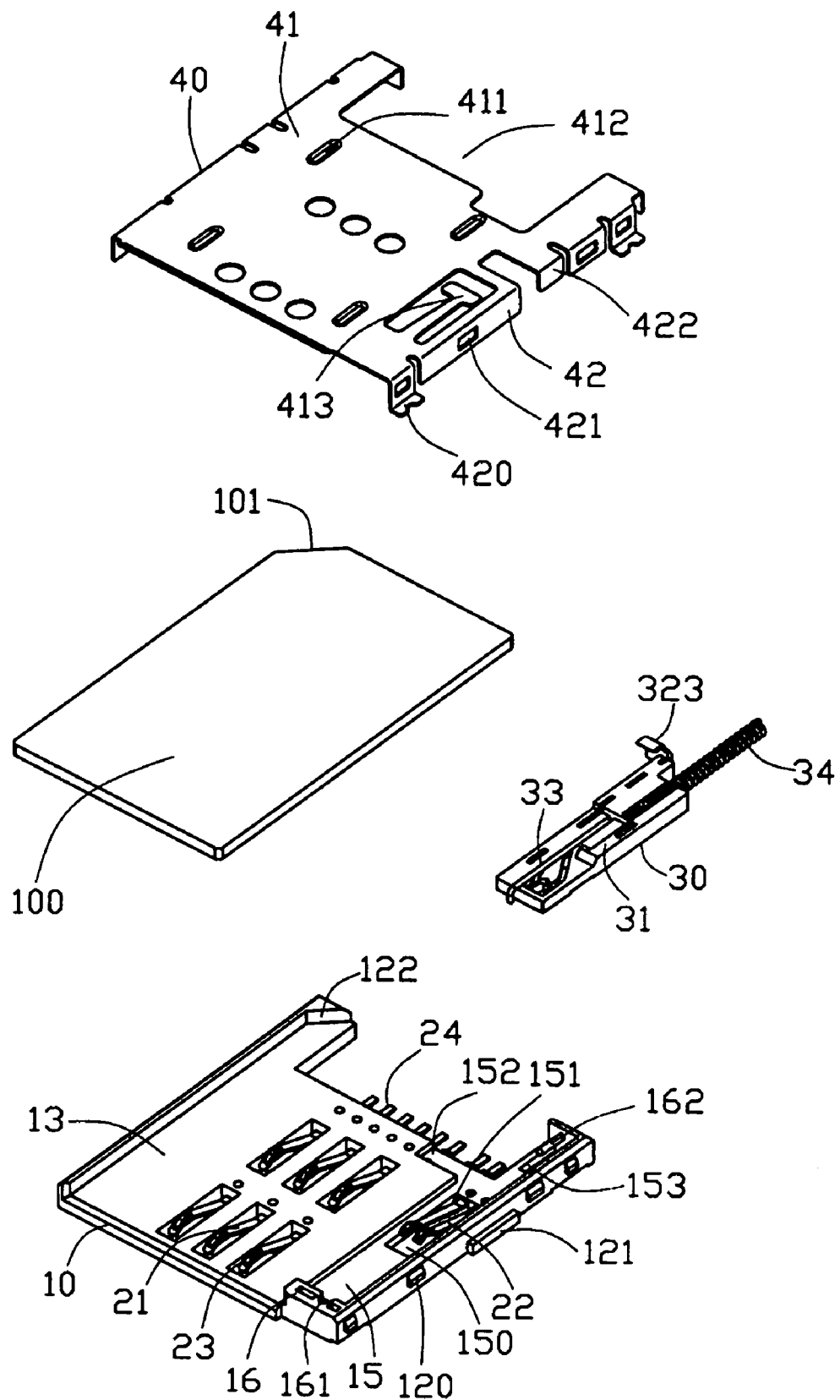
FIG. 3 is an exploded, perspective view of the card connector of FIG. 1 with an ejector detached from an insulating housing.
Figure 4:
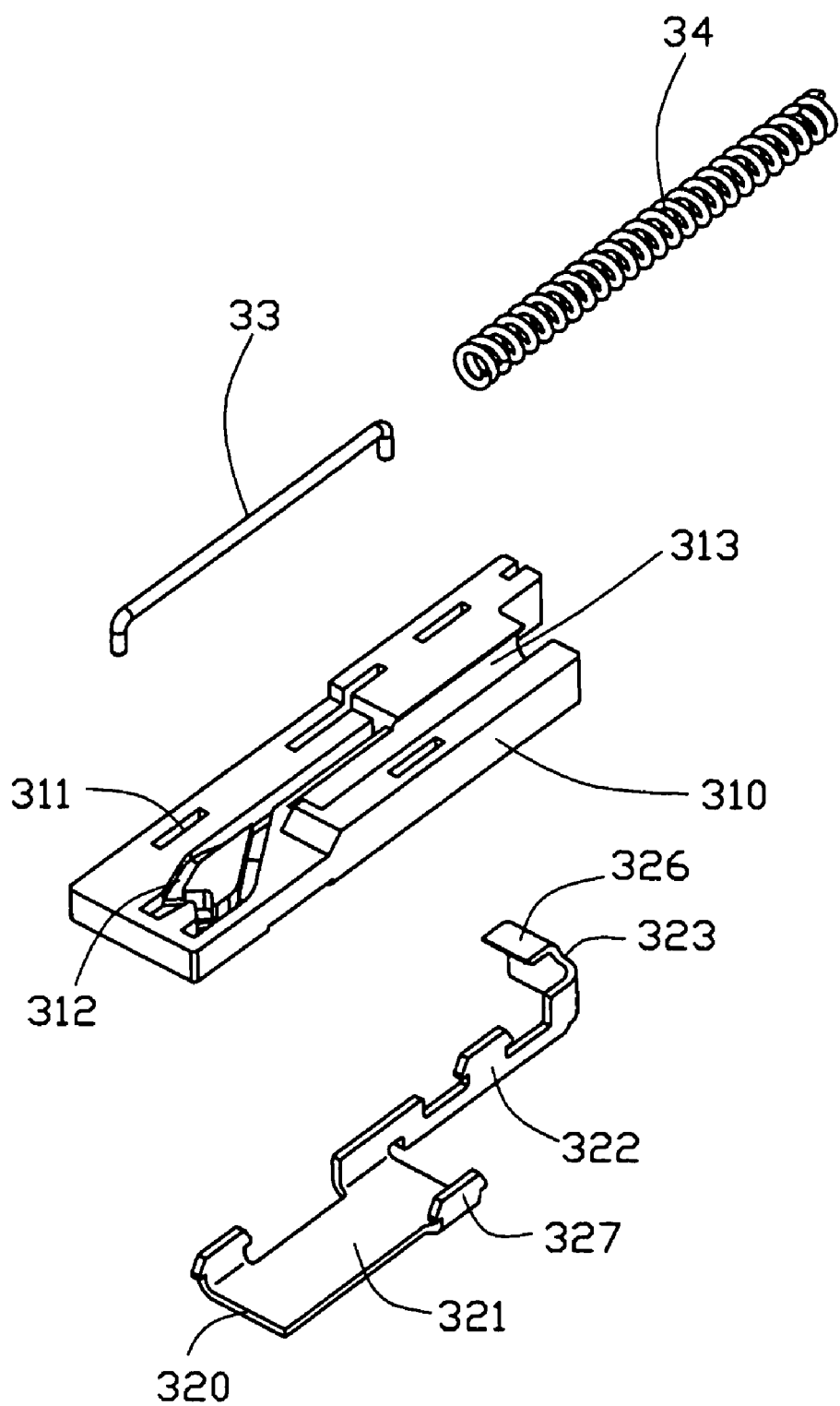
FIG. 4 is an exploded, perspective view of the ejector of the card connector of FIG. 1.
Figure 5:
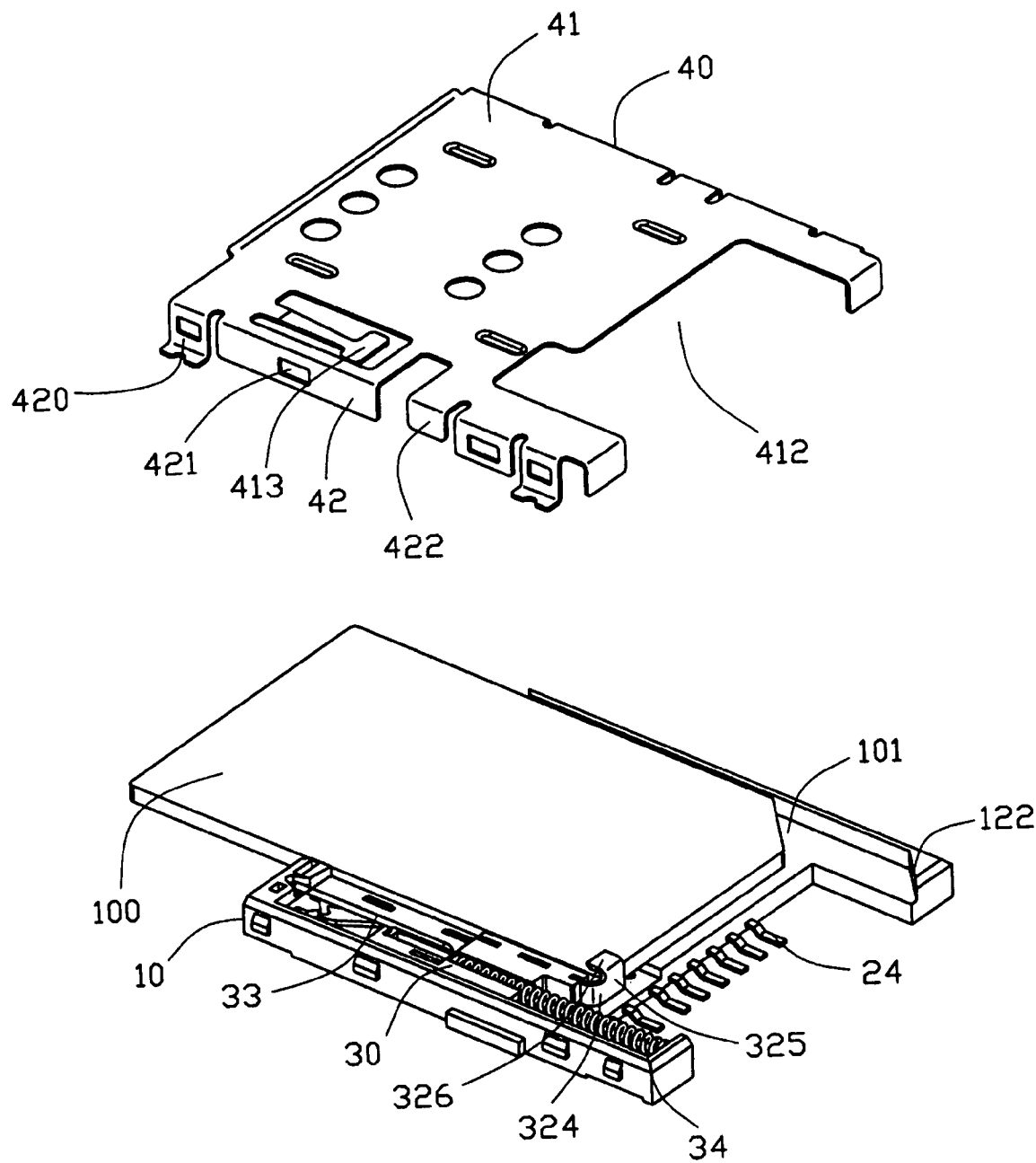
FIG. 5 is a partially assembled, perspective view of the card connector of FIG. 1 with a shell detached from the insulating housing.

Referring to FIGS. 2 and 3, the ejector 30 is used for ejecting the SIM card 100 out of the card connector. The ejector 30 comprises a slider 31, a pin member 33, a resilient member 34 and an ejecting member 320 for contacting and ejecting the SIM card 100 directly. In this embodiment, the resilient member 34 is a spring and the ejecting member 320 is a separate component. However, the ejecting member 320 also can be unitary with the slider 31 on condition that the ejecting member 320 can protrude into the card receiving space 13 to eject the SIM card 100.

The slider 31 is approximately an elongated cube configuration and can move along the card insertion and ejection direction with the SIM card 100 inserted and ejected. The slider 31 defines a heart-shaped slot 312 recessed downwardly from a top face thereof, a semi-circular receiving hole 313 recessed forwardly from a rear face thereof and a plurality of through slots 311 recessed downwardly from a top face a bottom face of lateral sides of the slider 31. One end of the spring 34 is disposed around the column 162 of the rear wall 16 and the other end is disposed into the receiving hole 313 of the slider 31. One end of the pin member 33 is moveably disposed in the heart-shaped slot 312 of the slider 31 and the other end is securely locked in a pinhole 161 of the front wall 16 of insulating housing 10. The pin member 33 and the heart-shaped slot 312 are referred as holding means and can hold the slider 31 in a final position where the card 100 is electrically connected with the card connector and can release the slider 31 when ejecting the card 100.

The ejecting member 320 is stamped from a metal sheet. The ejecting member 320 comprises a horizontal plate 321 and a holding arm 322 extending upward and rearward from rear end of one side of the horizontal plate 321 adjacent to the card receiving space 13. A plurality of hooks 324 protrudes upwardly from the holding arm 322 and lateral sides of the horizontal plate 321, respectively. In addition, the holding arm 322 is formed with a rectangular plate-shaped ejecting arm 323 bent from a free end thereof and transversely protruding into the card receiving space 13 and locating above the recess 152 of the bottom wall 11. The ejecting arm 323 is formed with a shielding portion 326 extending forwardly from an upper face thereof along the card ejection direction to expose into the card receiving space 13. The ejecting member 320 is securely assembled to a bottom face of the slider 31 with the hooks 324 interferencely received in the through slots 311 of the slider 31.

Referring to FIGS. 1-3, the shell 40 is made of metal sheet to cover the housing 10. The shell 40 comprises a base portion 41 and a pair of opposite right and left side portions 42 extending downwardly from lateral sides of the base portion 41. A rectangular opening 412 is defined in rear end of the base potion 41 to communicate with the opening 14 of the insulating housing 10. Furthermore, the base portion 41 is formed with a resilient piece 413 at front end thereof adjacent to the right side portion 42 for pressing downwardly against the pin member 33 in the heart-shaped slot 312 of the slider 31 of the ejector 30. Each side portion 42 is formed with a plurality of mating holes 421 for receiving the wedges 120 of the insulating housing 10 and a pair of soldering feet 420 on opposite distal ends along the card insertion direction for being mounted on a printed circuit board (not shown). An engaging piece 422 extends from the base portion 41 to expose into a gap (not labeled) defined in each side portion 42 to mate with the corresponding protruding block 121. Thus, the shell 40 is securely assembled to the insulating housing 10.

The SIM card 100 defines a cutout 101 in a corner between a rear end and a left side thereof. The left sidewall 12 of the insulating housing 10 is formed with a slanting face 122 faced to the card receiving space 13 at rear end thereof to recognize the cutout 101 in order to prevent the SIM card 100 from mismating. In process of the SIM card 100 inserting the card connector, a rear end of a right side of the card 100 will enter into a cavity defined by the ejecting arm 323, the shielding portion 326 and the slider 31 of the ejector 30 to collide with the ejecting arm 323. Then, to drive the slider 31 to move along the card insertion direction and to urge the spring 34 to elastically distort. In the meantime, the pin member 33 moves along the heart-shaped slot 312 of the ejector 30 to make the slider 31 finally achieve a final position or a locking position where the card 100 is electrically connected with the contacts 20 accurately and fully. In addition, the grounding terminals 22 are electrically connected with the horizontal plate 321 of the ejecting member 320 of the ejector 30 to discharge static.

When ejecting the card 100, a rearward push force is exerted to the card 100 to make the pin member 33 move along the heart-shaped slot 312 again so as to release the slider 31 from the final position. At this time, the resilient restorable force of the spring 34 urges the slider 31 to move along the card ejection direction so as to eject the card 100 out of the card connector in virtue of the ejecting arm 323 of ejector 30 pushing the card 100.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for receiving a card, comprising:
    an insulating housing defining a card receiving space with a card insertion/ejection direction;
    a plurality of contacts retained in the insulating housing and comprising a plurality of contacting portions exposed into the card receiving space to electrically connect with a card; and
    an ejector moveably assembled to the insulating housing, comprising a slider moving along the card insertion/ejection direction with the card inserted/ejected and having a side portion defining a boundary of the receiving space, and an ejecting member fixedly attached to the slider and having an ejecting arm extending from the slider and intersecting with the receiving space, and a shield portion extending from an upper edge of the ejecting arm and substantially defining an area jointly with the ejecting arm and in communication with the card receiving space.

2. The card connector as described in claim 1, wherein the ejector further comprises a holding means to securely hold the slider in a final position where the card is electrically connected with the contacts and to release the slider from the final position when pushing the card along the card insertion direction from the final position, and a resilient member disposed in the slider to urge the slider to move along the card ejecting direction.

3. The card connector as described in claim 2, wherein the resilient member is a spring.

4. The card connector as described in claim 2, wherein the holding means comprises a pin member and a heart-shaped slot disposed in the slider, and wherein one end of the pin member is assembled to the insulating housing and the other end is moveably disposed in the heart-shaped slot.

5. The card connector as described in claim 1, wherein the ejecting member is formed with a plurality of hooks to interferencely received in corresponding through slots of the slider.

6. The card connector as described in claim 1, wherein the ejecting member comprises a horizontal plate, a holding arm extending from the horizontal plate and the ejecting arm extending from a free end of the holding arm.

7. The card connector as described in claim 6, wherein the ejecting member is stamped and made of a metal sheet.

8. The card connector as described in claim 7, further comprising grounding terminals to electrically connect with the horizontal plate of the ejecting member when the slider is in the final position.

9. The card connector as described in claim 1, wherein the insulating housing defines an opening at rear end thereof, and wherein soldering portions of the contacts are exposed into the opening.

10. A card connector comprising:
an insulative housing;
a metallic shielding cover attached atop the housing and cooperating with said housing to define a card receiving cavity therebetween;
a plurality of contacts disposed in the housing with contacting portions extending upwardly into the card receiving cavity for engagement with a card received in said card receiving cavity; and
an ejection mechanism located on one side of the housing and moveable along a front-to-back direction; wherein
said ejection mechanism includes an engagement tab located around a rear end thereof, said engagement tab defining a vertical face extending in a transverse direction perpendicular to said front-to-back direction and adapted to be engaged with a front surface of the inserted card, and a horizontal face which is configured and positioned to be adapted to be engaged with a horizontal surface of the inserted card.

11. The card connector as claimed in claim 10; wherein said horizontal face is of a forward cantilever type with a free end toward a front end of the housing.

12. The card connector as claimed in claim 11, wherein said vertical face and said horizontal face are joined along an edge of said engagement tab, said edge of engagement tab adapted to be parallel to an edge of a front portion of the inserted card.

13. The card connector as claimed in claim 12, wherein said edge extends along said transverse direction perpendicular to the front-to-back direction.

14. the card connector as claimed in claim 11, wherein said engagement tab is metallic.

15. The card connector as claimed in claim 12, wherein said engagement tab is essentially L-shaped, and the horizontal face extends from the edge forwardly.

16. The card connector as claimed in claim 15, wherein the horizontal face is cantilevered from the vertical face.

17. A card connector assembly comprising:
an insulative housing defining a first opening at a rear portion thereof;
a metallic shielding cover attached a top the housing and cooperating with said housing to define a card receiving cavity therebetween, said shielding cover defining a second opening at a rear section thereof in alignment with said first opening in a vertical direction;
a pluarlity of contacts disposed in the housing with contacting portions extending upwardly into the card receiving cavity, said contacts including a plurality of solder tails located in the first opening and being able to be inspected through said second opening in said vertical direction; and
a card inserted into the card receiving cavity along a front-to-back direction under a condition that a front end section thereof enters the card receiving cavity before a rear end section thereof; wherein
when the card is moved to a final rear position, the front end section of said card blocks the inspection of said solder tails.

18. The connector assembly as claimed in claim 17, wherein said housing defines a chamber, around a rear end thereof, forwardly facing toward said first cutout.

19. The connector assembly as claimed in claim 17, wherein an ejector is assembled to the insulating housing, comprising an ejecting arm exposed into the card receiving space to eject a card, and a shield portion extending forwardly in the card receiving space along the card ejection direction from an upper surface of the ejecting arm.

20. The connector assembly as claimed in claim 17, wherein said second opening is rectangular.

* * * * *